United States Patent
Lee et al.

(10) Patent No.: US 10,629,942 B2
(45) Date of Patent: Apr. 21, 2020

(54) SECONDARY BATTERY

(71) Applicant: LG Chem, Ltd., Seoul (KR)

(72) Inventors: Jung Pil Lee, Daejeon (KR); Hee Won Lee, Daejeon (KR)

(73) Assignee: LG Chem, Ltd. (KR)

( * ) Notice: Subject to any disclaimer, the term of this patent is extended or adjusted under 35 U.S.C. 154(b) by 105 days.

(21) Appl. No.: 15/765,034

(22) PCT Filed: May 22, 2017

(86) PCT No.: PCT/KR2017/005288
§ 371 (c)(1),
(2) Date: Mar. 30, 2018

(87) PCT Pub. No.: WO2017/213364
PCT Pub. Date: Dec. 14, 2017

(65) Prior Publication Data
US 2018/0287184 A1     Oct. 4, 2018

(30) Foreign Application Priority Data
Jun. 9, 2016  (KR) .................. 10-2016-0071638

(51) Int. Cl.
*H01M 10/04* (2006.01)
*H01M 2/08* (2006.01)
*H01M 10/42* (2006.01)

(52) U.S. Cl.
CPC ........... *H01M 10/045* (2013.01); *H01M 2/08* (2013.01); *H01M 10/04* (2013.01); *H01M 10/0431* (2013.01); *H01M 10/0459* (2013.01); *H01M 10/4235* (2013.01)

(58) Field of Classification Search
CPC ........... H01M 10/045; H01M 10/4235; H01M 10/04; H01M 10/0459; H01M 10/0431; H01M 2/08
See application file for complete search history.

(56) References Cited

U.S. PATENT DOCUMENTS

2010/0291432 A1\* 11/2010 Kim .................. H01M 10/0431
429/163

FOREIGN PATENT DOCUMENTS

| | | |
|---|---|---|
| JP | 2002100326 A | 4/2002 |
| JP | 2009199974 A | 9/2009 |
| KR | 100958649 B1 | 5/2010 |
| KR | 20110083894 A | 7/2011 |
| KR | 20140050182 A | 4/2014 |
| KR | 20150092854 A | 8/2015 |

OTHER PUBLICATIONS

Search report from International Application No. PCT/KR2017/005288, dated Aug. 16, 2017.

\* cited by examiner

*Primary Examiner* — Cynthia K Walls
(74) *Attorney, Agent, or Firm* — Lerner, David, Littenberg, Krumholz & Mentlik, LLP

(57) ABSTRACT

The present invention relates to a secondary battery comprising: an electrode assembly; and a thermal contractible protection layer disposed on an outer surface of the electrode assembly and contracted by heat.

20 Claims, 9 Drawing Sheets

SECONDARY BATTERY

CROSS-REFERENCE TO RELATED APPLICATIONS

The present application is a national phase entry under 35 U.S.C. § 371 of International Application No. PCT/KR2017/005288 filed May 22, 2017, which claims priority to Korean Patent Application No. 10-2016-0071638, filed on Jun. 9, 2016, the disclosures of which are incorporated herein by reference.

TECHNICAL FIELD

The present invention relates to a secondary battery, and more particularly, to a secondary battery that effectively suppresses swelling of an electrode assembly.

BACKGROUND ART

In general, secondary batteries refer to chargeable and dischargeable, unlike primary batteries that are not chargeable. The secondary batteries are being widely used in the high-tech electronic fields such as mobile phones, notebook computers, and camcorders.

Such a secondary battery comprises an electrode assembly and a case in which the electrode assembly is accommodated. The electrode assembly has a structure in which a plurality of electrodes and a plurality of separators are alternately stacked on each other.

Also, the secondary battery is subjected to a charging/discharging process. Here, an electrode may be expanded to cause a change in interface between the electrode and the separator, and thus, the electrode assembly may be swelled. Particularly, when the secondary battery is changed in thickness or increases in resistance, the lifespan of the secondary battery may be reduced.

DISCLOSURE OF THE INVENTION

Technical Problem

The present invention has been made to solve the abovementioned problem, and an object of the prevent invention is to provide a secondary battery that effectively suppresses swelling of an electrode assembly when charged and discharged to improve the lifespan of the electrode assembly.

Technical Solution

To achieve the abovementioned object, a secondary battery according to the present invention comprises: an electrode assembly; and a thermal contractible protection layer disposed on an outer surface of the electrode assembly and contracted by heat.

The thermal contractible protection layer may be provided to surround a circumference of the electrode assembly.

The thermal contractible protection layer may be provided to surround to an entire circumference of the electrode assembly.

The thermal contractible protection layer may be provided to surround a portion of the circumference of the electrode assembly.

The thermal contractible protection layer may be wound in a width direction of the electrode assembly to surround a portion of the circumference of the electrode assembly.

A plurality of thermal contractible protection layers may be wound in the width direction of the electrode assembly.

The thermal contractible protection layer may be wound in a longitudinal direction of the electrode assembly to surround a portion of the circumference of the electrode assembly.

A plurality of thermal contractible protection layers may be wound in the longitudinal direction of the electrode assembly.

The thermal contractible protection layer may be provided as a thermal contractible protection tape.

The thermal contractible protection layer may be made of an insulative material.

The thermal contractible protection layer may be provided as a biaxial oriented film.

The thermal contractible protection layer may be made of one of nylon, polypropylene, polyester, polyamide, polyethylene, polyethylene phthalate, and polystyrene.

The thermal contractible protection layer may be made of a material having no thermosetting property.

The secondary battery may further comprise a case in which the electrode assembly comprising the thermal contractible protection layer is accommodated, wherein the case may comprise an outer thermal contractible protection layer that is contracted by heat.

The case may have a structure in which a metal layer, an outer adhesion layer, and the outer thermal contractible protection layer are sequentially stacked.

The outer thermal contractible protection layer may be attached to the outermost side of the case.

The outer thermal contractible protection layer may be provided in the case and disposed on the outermost side of the case.

The outer thermal contractible protection layer may be disposed on the innermost side of the case.

The outer thermal contractible protection layer may be made of a material having no thermosetting property.

A sealing layer and an inner adhesion layer may be further stacked on an inner surface of the case.

The case may have a structure in which the sealing layer, the inner adhesion layer, the metal layer, the outer adhesion layer, and the outer thermal contractible protection layer are sequentially stacked outward from the inside thereof.

Advantageous Effects

The present invention has effects as follows.

First: the secondary battery of the present invention may comprise the thermal contractible protection layer outside the electrode assembly to suppress the swelling of the electrode assembly and improve the lifespan.

Second: in the secondary battery of the present invention, the thermal contractible protection layer may be provided as the thermal contractible protection tape and thus be easily used and manufactured.

Third: in the secondary battery of the present invention, the thermal contractible protection layer may be provided as the biaxial oriented film to assist the contraction of the electrode assembly and also to use the heat generated in the cell and thereby to prevent the cell from being degraded due to the increase of the temperature thereof.

Fourth: in the secondary battery of the present invention, the thermal contractible protection layer may be made of the insulative material to prevent the short circuit with the outside from occurring due to the thermal contractible protection layer.

Fifth: in the secondary battery according to the present invention, the thermal contractible protection layer may be made of the material having no thermosetting property. Thus, when the thermal contractible protection layer decreases in temperature, it may return to its original state to achieve the continuity in use.

Sixth: the secondary battery of the present invention may comprise the thermal contractible protection layer in the case accommodating the electrode assembly to improve the swelling and the lifespan of the electrode assembly as well as suppress the deformation of the secondary battery.

Seventh: the secondary battery of the present invention may comprise the thermal contractible protection layer to surround the entirety or a portion of the circumference of the electrode assembly to improve the usability and the efficiency.

BRIEF DESCRIPTION OF THE DRAWINGS

FIG. 3 is a view of a thermal contractible protection tape, FIG. 4 is a view of a thermal contractible protection layer disposed on an entire circumference of the electrode assembly in a width direction, FIG. 5 is a view of the thermal contractible protection layer disposed on a portion of the circumference of the electrode assembly in the width direction, FIG. 6 is a view illustrating a plurality of thermal contractible protection layers of the electrode assembly in the width direction, FIG. 7 is a view of the thermal contractible protection layer disposed on a portion of the circumference of the electrode assembly in a longitudinal direction, and FIG. 8 is a view illustrating a plurality of thermal contractible protection layers of the electrode assembly in the longitudinal direction.

MODE FOR CARRYING OUT THE INVENTION

Figure 1:
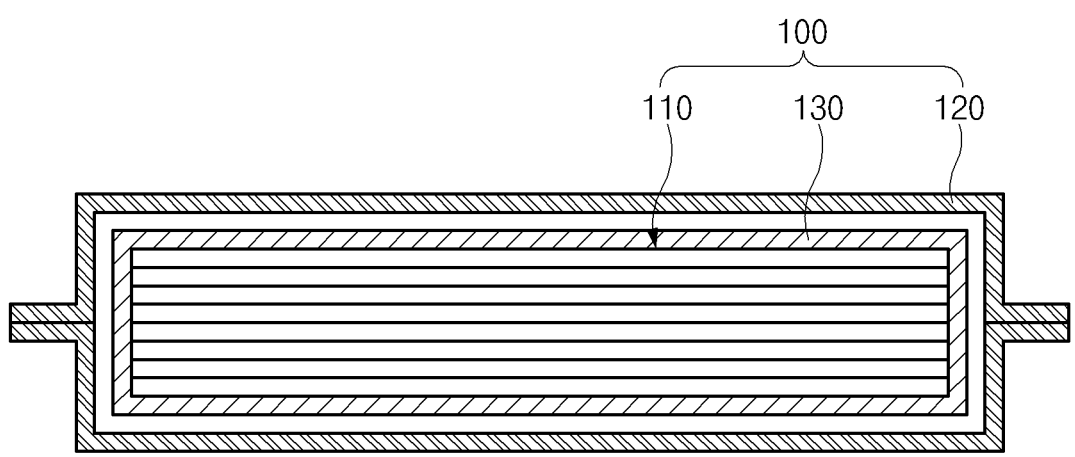
FIG. 1 is a cross-sectional view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment]

As illustrated in FIG. 1, a secondary batter according to a first embodiment of the present invention comprises an electrode assembly 110 and a case 120 in which the electrode assembly 110 is accommodated.

Here, the electrode assembly 110 is manufactured by alternately stacking a plurality of electrodes and a plurality of separators in a vertical direction. The plurality of electrodes may be provided with a first electrode and a second electrode, and the plurality of separators may be provided with a first separator and a second separator.

That is, the electrode assembly may be provided as a radical unit in which the first electrode, the first separator, the second electrode, and the second separator are sequentially stacked in the vertical direction or a unit stack part in which two or more radical units are stacked.

To improve performance of the secondary battery, a charging/discharging process is performed. Here, in the electrode assembly 110, heat is generated when charged and discharged, and simultaneously, swelling occurs. Particularly, when the swelling is large or locally occurs, an outer appearance of a cell may be deformed, or the electrode may be extracted to reduce a lifespan.

To solve the abovementioned problem, the secondary battery according to the first embodiment of the present invention comprises a thermal contractible protection layer 130 that effectively suppresses the swelling of the electrode assembly 110 when charged and discharged.

Figure 2:
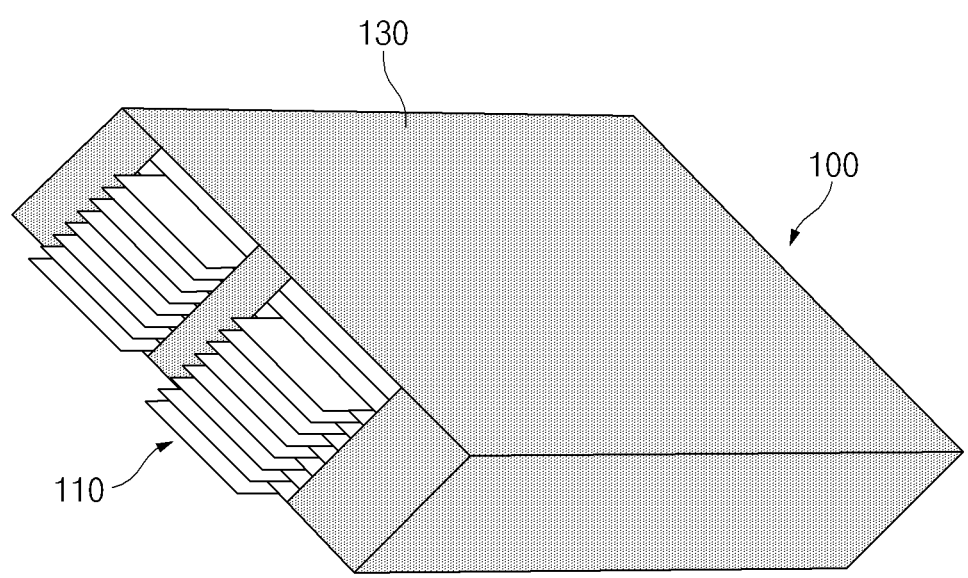
FIG. 2 is a perspective view of an electrode assembly according to the first embodiment of the present invention.

That is, as illustrated in FIG. 2, the thermal contractible protection layer 130 is provided to surround the outside of the electrode assembly 110. Thus, expansion of the electrode assembly 110 when charged and discharged may be suppressed by physical strength of the thermal contractible protection layer 130 itself, and the thermal contractible protection layer 130 may additionally press the electrode assembly 110 while being contracted by heat generated in the electrode assembly 110 or the outside to effectively suppress the swelling of the electrode assembly 110, thereby preventing the electrode assembly from being deformed and prevent the electrode from being extracted.

Figure 3:
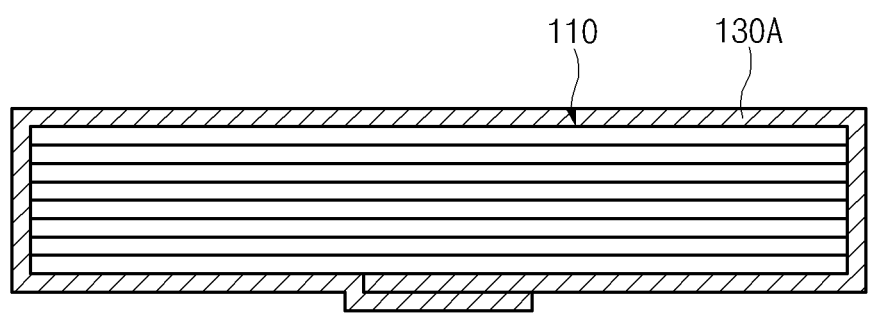
FIGS. 3 to 8 are cross-sectional views of a thermal contractible protection layer according to various embodiments.

As illustrated in FIG. 3, the thermal contractible protection layer 130 may be provided as a thermal contractible protection tape 130A. That is, the thermal contractible protection tape 130A is attached to surround a circumference of the electrode assembly 110, thereby improving efficiency in work and suppressing the swelling of the electrode assembly 110.

Particularly, the wound number of thermal contractible protection tape 130A may be adjusted to control a pressure applied to the electrode assembly 110. That is, when the electrode assembly 110 has a large stacked thickness, the wound number of thermal contractible protection tape 130A may increase to effectively suppress the swelling of the electrode assembly 110. When the electrode assembly 110 has a small stacked thickness, the wound number of thermal contractible protection tape 130A may decrease to increase the pressure applied to the electrode assembly 110.

The thermal contractible protection layer 130 may be provided to surround the entire or a portion of the circumference of the electrode assembly 110.

That is, the electrode assembly 110 in which large swelling occurs may be provided with the thermal contractible protection layer 130 that surrounds the entire circumference of the electrode assembly 110. The electrode assembly 110 in which small swelling occurs or around which the thermal contractible protection layer 130 does not surround the entire circumference thereof may be provided with the thermal contractible protection layer 130 that surrounds a portion of the circumference of the electrode assembly 110.

Figure 4:
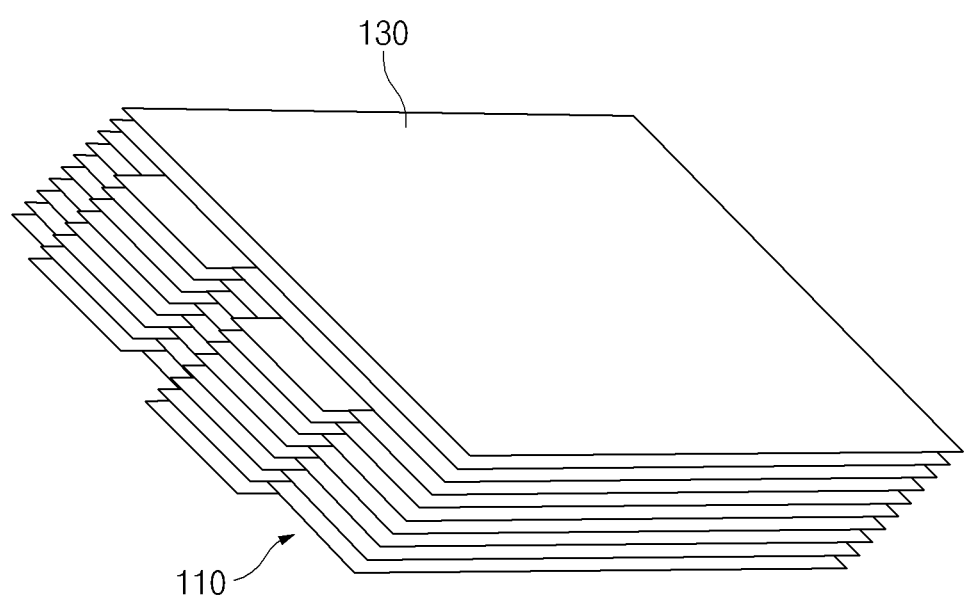

Here, the thermal contractible protection layer 130 disposed on a portion of the circumference of the electrode assembly 110 may be provided as follows:

First: as illustrated in FIG. 4, the thermal contractible protection layer 130 may be provided to surround the entire circumference of the electrode assembly 110 in a width direction, i.e., entire top/bottom/left/right surfaces of the electrode assembly 110.

Figure 5:
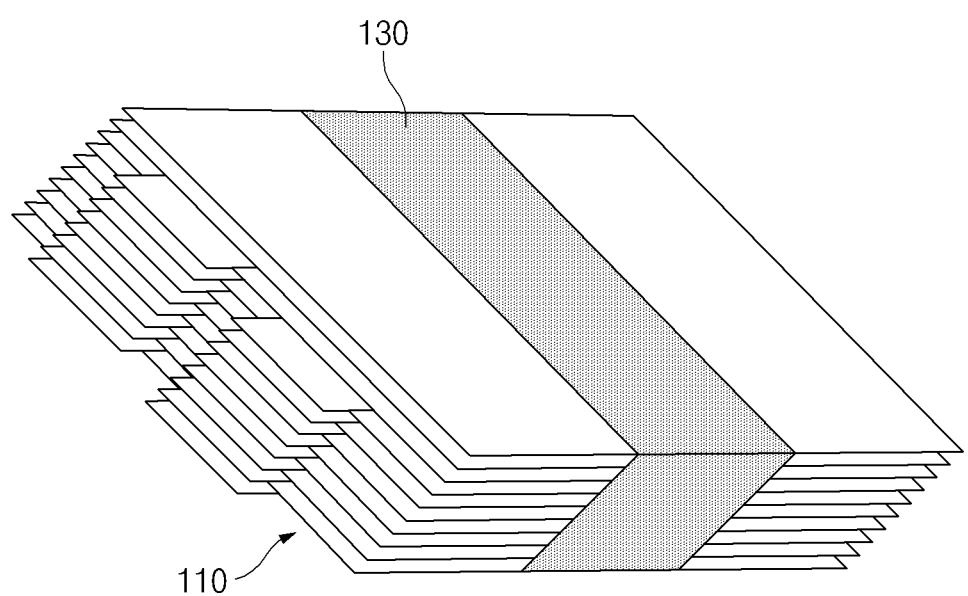

Second: as illustrated in FIG. 5, the thermal contractible protection layer 130 may be provided to surround a portion of the circumference of the electrode assembly 110 in the width direction, i.e., a portion of the top/bottom/left/right surfaces of the electrode assembly 110. For example, the thermal contractible protection layer 130 may be provided to pass through centers of the top/bottom/left/right surfaces of the electrode assembly 110 in the width direction.

Figure 6:
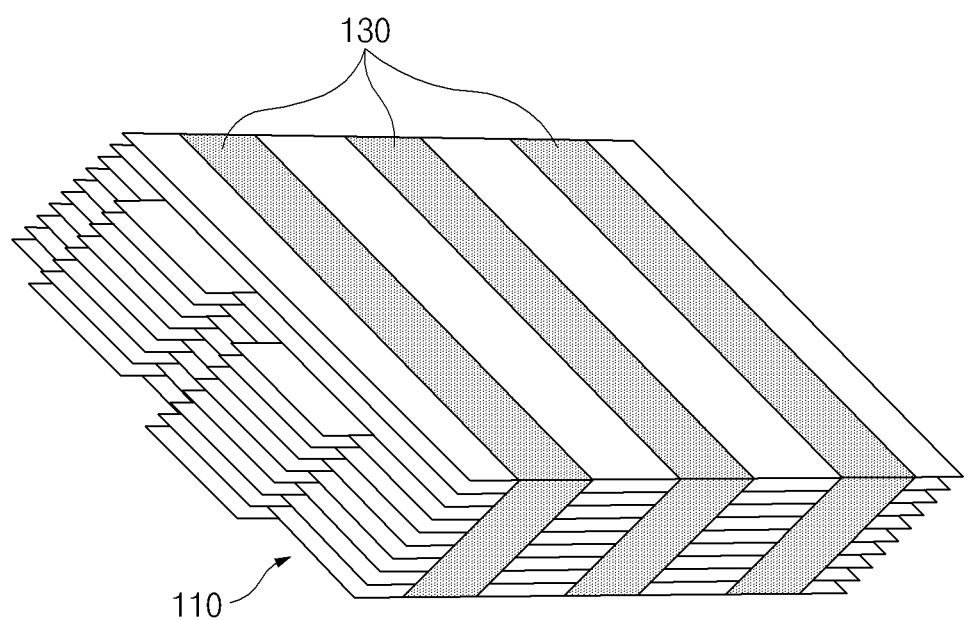

Third: as illustrated in FIG. 6, the thermal contractible protection layer 130 may be provided in plurality, and the plurality of thermal contractible protection layers 130 may be provided to surround a portion of the top/bottom/left/right surfaces of the electrode assembly 110. For example, the three thermal contractible protection layers 130 may be provided to pass through the centers of the top/bottom/left/right surfaces and both side ends of the electrode assembly 110 in the width direction.

Figure 7:
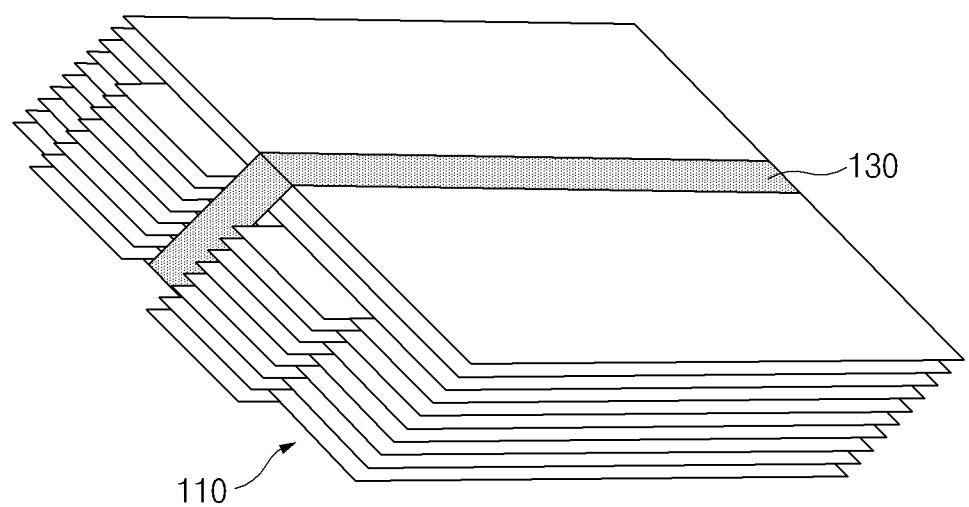

Fourth: as illustrated in FIG. 7, the thermal contractible protection layer 130 may be provided to surround a portion of the circumference of the electrode assembly 110 in a longitudinal direction, i.e., a portion of front/rear/top/bottom surfaces of the electrode assembly 110. For example, the thermal contractible protection layer 130 may be provided to pass through centers of the front/rear/top/bottom surfaces of the electrode assembly 110 in the longitudinal direction.

Figure 8:
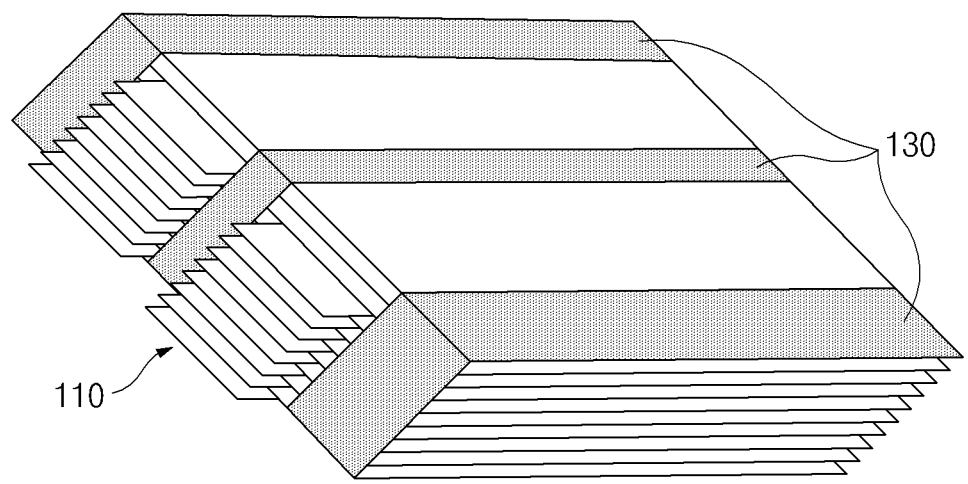

Fifth: as illustrated in FIG. 8, the thermal contractible protection layer 130 may be provided in plurality, and the plurality of thermal contractible protection layers 130 may be provided to surround a portion of the front/rear/top/bottom surfaces of the electrode assembly 110. For example, the three thermal contractible protection layers 130 may be provided to pass through the centers of the front/rear/top/bottom surfaces and both side ends of the electrode assembly 110 in the longitudinal direction.

As described above, the thermal contractible protection layer 130 may be provided to the entirety or a portion of the circumference of the electrode assembly 110 according to a size, a shape, and a thickness of the electrode assembly 110 to improve efficiency and also effectively suppress the swelling of the electrode assembly 110.

The thermal contractible protection layer 130 may be made of various materials to improve safety.

First, the thermal contractible protection layer 130 may be made of a material having an insulation property. That is, if the thermal contractible protection layer 130 is made of a conductive material, other electrodes provided in the electrode assembly 110 may be connected to each other through the thermal contractible protection layer 130 to cause short circuit. To prevent this phenomenon from occurring, the thermal contractible protection layer 130 may be made of an insulative material to prevent other electrodes from being short-circuited with each other and also previously prevent the short circuit from occurring.

Second: the thermal contractible protection layer 130 may be provided as a biaxial oriented film. That is, the biaxial oriented film is excellent in strength, thermal contraction, and transparency. Since the thermal contractible protection layer is provided as the biaxial oriented film, the expansion in volume of the electrode assembly 110 may be stably suppressed when charged and discharged to prevent the electrode assembly 110 from being deformed.

Third: the thermal contractible protection layer 130 may be made of one material of nylon, polypropylene, polyester, polyamide, polyethylene, polyethylene phthalate, and polystyrene. The material may press the electrode assembly 110 when are not charged and discharged. Thus, the material may be contracted by heat generated by the electrode assembly 110 only when charged and discharged to effectively press the electrode assembly 110.

Fourth: the thermal contractible protection layer 130 may be made of a material having no thermosetting property.

That is, the thermal contractible protection layer 130 may be made of a material that is hardly hardened as heat is applied thereto. Thus, event through the thermal contractible protection layer 130 is contracted by the heat generated in the electrode assembly 110, the thermal contractible protection layer 130 may have flexibility to stably press the electrode assembly. Particularly, in case of the material having no thermosetting property, when the thermal contractible protection layer 130 decreases in temperature, the thermal contractible protection layer 125 may return to its original shape. In this case, continuity in use may be achieved.

As described above, the secondary battery according to the first embodiment of the present invention may comprise the thermal contractible protection layer 130 on an outer circumferential surface of the electrode assembly 110 to effectively suppress the swelling of the electrode assembly 110 when charged and discharged, particularly, to prevent the electrode assembly 110 and the secondary battery from being deformed, thereby improving safety and marketability.

Hereinafter, in description of an electrode assembly according to another embodiment of the present invention, constituents having similar configuration have been given with the same reference numeral in the drawings, and thus their duplicated descriptions will be omitted.

[Secondary Battery According to Second Embodiment]

Figure 9:
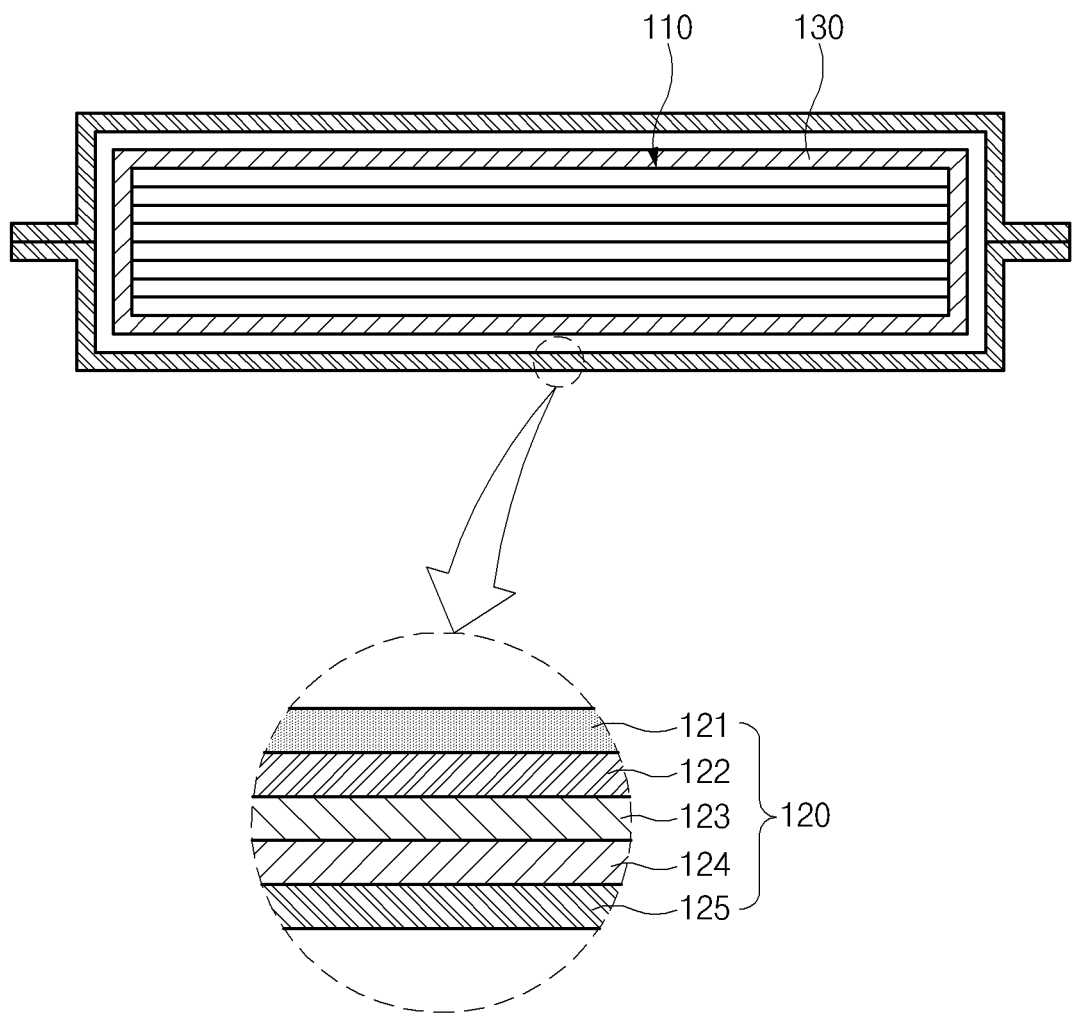
FIG. 9 is a cross-sectional view of a secondary battery according to a second embodiment of the present invention.

As illustrated in FIG. 9, a secondary battery according to a second embodiment of the present invention comprises an electrode assembly 110 on which a thermal contractible protection layer 130 is disposed on an outer circumferential surface thereof and a case 120 accommodating the electrode assembly 110 and comprising a thermal contractible protection layer.

Here, to classify the thermal contractible protection layers, the thermal contractible protection layer disposed on the case 120 is referred to as an outer thermal contractible protection layer 125.

That is, in the secondary battery according to the second embodiment of the present invention, the thermal contractible protection layer 130 disposed on the electrode assembly 110 suppresses the swelling of the electrode assembly 110 first, and then, the outer thermal contractible protection layer 125 disposed on the case 120 additionally suppresses the swelling of the electrode assembly 110. Thus, the electrode assembly 110 and the case 120 may be effectively prevented from being deformed.

Here, the case 120 has a structure in which a metal layer 123, an outer adhesion layer 124, and the outer thermal contractible protection layer 125 are sequentially stacked. That is, the metal layer 123 may maintain an outer appearance of the case 120, the outer thermal contractible protection layer 125 may prevent the case 120 from being deformed, and the outer adhesion layer 124 may improve coupling force between the metal layer 123 and the outer thermal contractible protection layer 125.

The outer thermal contractible protection layer 125 may be disposed on the outermost side of the case 120. For example, the case may have a structure in which the metal layer 123, the outer adhesion layer 124, and the outer thermal contractible protection layer 125 are sequentially stacked outward from the inside thereof. Thus, a problem occurring due to contact between the electrode assembly 110 accommodated in the case 120 and the outer thermal contractible protection layer 125 may be previously prevented to more stably contract the case 120.

Here, the outer thermal contractible protection layer 125 may be attached to the outermost side of the case 120 after the case 120 is manufactured. When the case 120 is manufactured, the outer thermal contractible protection layer 125 may be disposed on the outermost side of the case 120 and then integrated with the case 120. Thus, convenience and easiness in manufacture may be improved.

The outer thermal contractible protection layer 125 may be disposed on the innermost side of the case 120. For example, the case 120 has a structure in which the outer thermal contractible protection layer 125, the outer adhesion layer 124, and the metal layer 123 are sequentially stacked outward from the inside thereof.

The outer thermal contractible protection layer 125 may be made of the same material as the above-described thermal contractible protection layer 130. Here, duplicated descriptions thereof will be omitted.

A sealing layer 121 and an inner adhesion layer 122 may be further stacked on an inner surface of the case 120. That is, the case 120 may have a structure in which the sealing layer 121, the inner adhesion layer 122, the metal layer 123, the outer adhesion layer 124, and the outer thermal contractible protection layer 125 are sequentially stacked outward from the inside thereof. Here, the sealing layer 121 may improve sealability of the case 121, and the inner adhesion layer 122 may improve coupling force between the sealing layer 121 and the metal layer 123. As described above, the secondary battery according to the second embodiment of the present invention may comprise the thermal contractible protection layer 130 and the outer thermal contractible protection layer 125 to effectively suppress the swelling of the electrode assembly 110 and prevent the electrode assembly 110 and the secondary battery from being deformed.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
an electrode assembly; and
a thermal contractible protection layer disposed on an outer surface of the electrode assembly and contracted by heat, wherein the thermal contractible protection layer is provided as a biaxial oriented film.

2. The secondary battery of claim 1, wherein the thermal contractible protection layer is provided to surround a circumference of the electrode assembly.

3. The secondary battery of claim 2, wherein the thermal contractible protection layer is provided to surround to an entire circumference of the electrode assembly.

4. The secondary battery of claim 2, wherein the thermal contractible protection layer is provided to surround a portion of the circumference of the electrode assembly.

5. The secondary battery of claim 4, wherein the thermal contractible protection layer is wound in a width direction of the electrode assembly to surround a portion of the circumference of the electrode assembly.

6. The secondary battery of claim 5, wherein a plurality of thermal contractible protection layers are wound in the width direction of the electrode assembly.

7. The secondary battery of claim 4, wherein the thermal contractible protection layer is wound in a longitudinal direction of the electrode assembly to surround a portion of the circumference of the electrode assembly.

8. The secondary battery of claim 7, wherein a plurality of thermal contractible protection layers are wound in the longitudinal direction of the electrode assembly.

9. The secondary battery of claim 1, wherein the thermal contractible protection layer is provided as a thermal contractible protection tape.

10. A secondary battery comprising:
an electrode assembly;
a thermal contractible protection layer disposed on an outer surface of the electrode assembly and contracted by heat; and
a case in which the electrode assembly comprising the thermal contractible protection layer is accommodated,
wherein the case comprises an outer thermal contractible protection layer that is contracted by heat.

11. The secondary battery of claim 10, wherein the outer thermal contractible protection layer is made of an insulative material.

12. The secondary battery of claim 10, wherein the outer thermal contractible protection layer is provided as a biaxial oriented film.

13. The secondary battery of claim 10, wherein the outer thermal contractible protection layer is made of one of nylon, polypropylene, polyester, polyamide, polyethylene, polyethylene phthalate, and polystyrene.

14. The secondary battery of claim 1, wherein the thermal contractible protection layer is made of a material having no thermosetting property.

15. The secondary battery of claim 10, wherein the case has a structure in which a metal layer, an outer adhesion layer, and the outer thermal contractible protection layer are sequentially stacked.

16. The secondary battery of claim 10, wherein the outer thermal contractible protection layer is attached to the outermost side of the case.

17. The secondary battery of claim 10, wherein the outer thermal contractible protection layer is provided in the case and disposed on the outermost side of the case.

18. The secondary battery of claim 10, wherein the outer thermal contractible protection layer is disposed on the innermost side of the case.

19. The secondary battery of claim 10, wherein the outer thermal contractible protection layer is made of a material having no thermosetting property.

20. The secondary battery of claim 15, wherein a sealing layer and an inner adhesion layer are further stacked on an inner surface of the case.

* * * * *